INVENTOR.
WILLIAM W. MEDLINSKI

United States Patent Office
3,523,226
Patented Aug. 4, 1970

3,523,226
SIGNAL MONITORING SYSTEM FOR A CLOSED LOOP SERVO SYSTEM
William Walter Medlinski, Clifton, N.J., assignor to The Bendix Corporation, a corporation of Delaware
Filed July 28, 1967, Ser. No. 656,735
Int. Cl. G05b 23/02
U.S. Cl. 318—565                                         9 Claims

ABSTRACT OF THE DISCLOSURE

A system for monitoring signals varying as related functions. A signal from a signal source is combined with a signal generated as a function of apparatus for providing a signal related to the signal from the signal source. A comparator compares the combined signal with the signal from the signal source for indicating when the difference between the compared signals exceeds a predetermined threshold level. The system is adjustable for independent alarm sensing of the signal from the signal source and the related signal.

BACKGROUND OF THE INVENTION

Field of the invention

This invention relates to monitoring signals varying as related functions. More particularly, this invention relates to monitoring said signals using a single comparator and without duplication of functions.

Description of the prior art

Redundant control systems include means for providing signals in accordance with a desired control function and means for providing signals proportional to the control function. Prior to the present invention, devices for monitoring the aforementioned signals required duplicate comparators and duplicate function generating apparatus.

SUMMARY OF THE INVENTION

The present invention includes means for providing a signal in accordance with a predetermined control function, means for providing a signal proportional to said control function signal, means for providing a signal as a function of the last mentioned means, and means for providing a redundant control function signal. The signal as a function of said last mentioned means is combined with the redundant signal, and the combined signal and the control function signal are applied to a comparator which provides a signal for operating an alarm circuit when the difference between the applied signals exceeds a predetermined threshold.

One object of this invention is to monitor signals varying as related functions, and which monitoring is accomplished with a single comparator and without duplication of the functions.

Another object of this invention is to provide independent alarm sensing of the related signals.

Another object of this invention is to monitor a system providing a control signal and providing an additional signal proportional to the control signal, and which monitoring is accomplished without duplicating the system.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
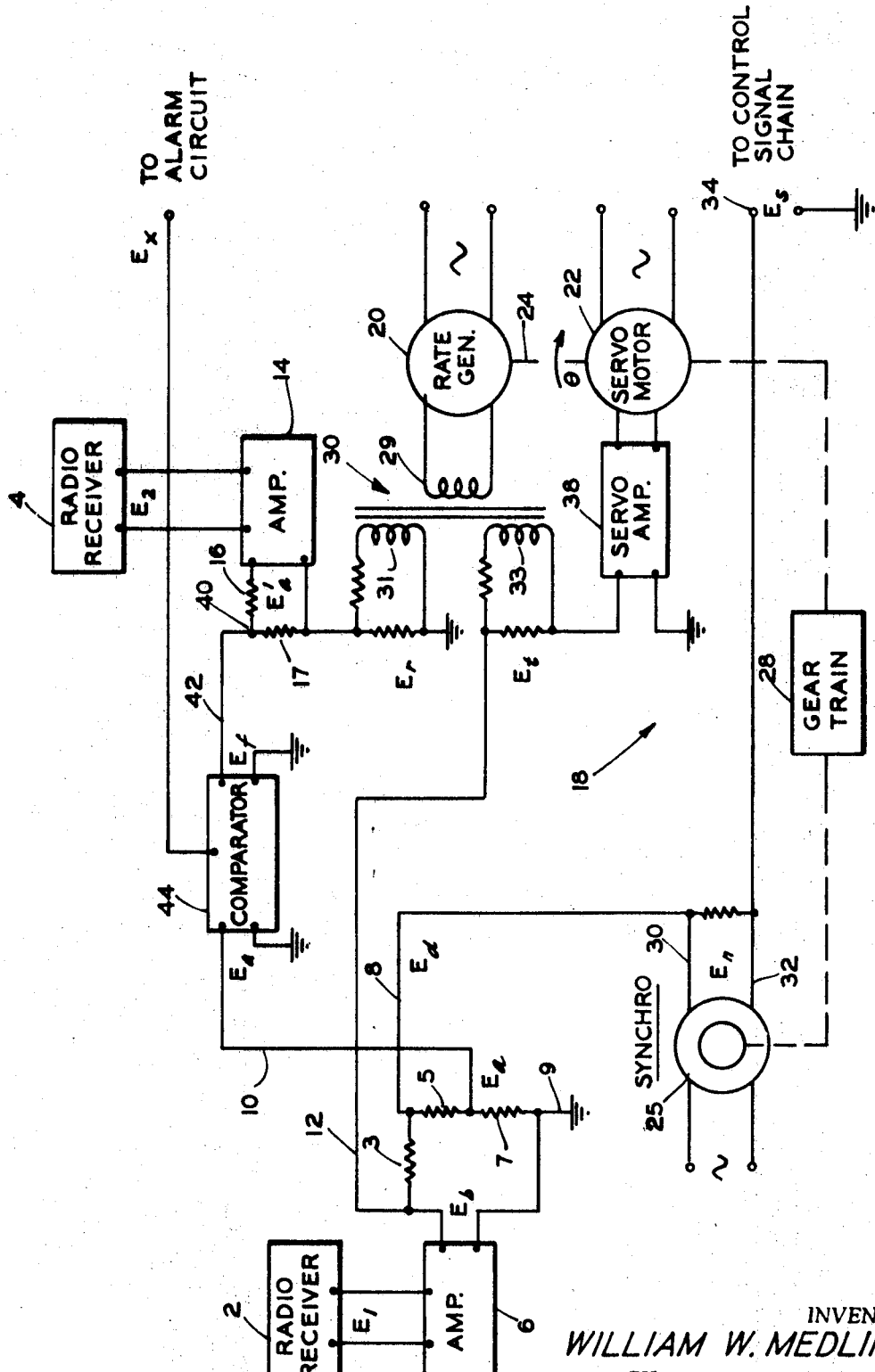
FIG. 1 is an electrical schematic diagram showing a displacement plus integral (two related functions) control system and including a monitor according to the invention.

With reference to FIG. 1, a radio receiver 2 and a radio receiver 4 receive signals from a ground based navigational station radiating an infinite number of beams in all directions. Radio receiver 2 provides a signal $E_1$ which is applied to an amplifier 6 and therefrom through resistors 3, 5 and 7 for providing across a conductor 8 and a grounded conductor 9 a signal $E_d$ corresponding in polarity and amplitude to the displacement of the aircraft from a preselected radio beam, for providing across a conductor 10 and grounded conductor 9 a signal $E_a$ which is proportional by a predetermined factor to displacement signal $E_d$ and for providing across a conductor 12 and grounded conductor 9 a signal $E_b$ which is proportional by another predetermined factor to displacement signal $E_d$. Radio receiver 4 provides a redundant signal $E_2$ which is applied to an amplifier 14 and therefrom through resistors 16 and 17 for providing a signal $E_a'$ proportional to signal $E_a$.

There is shown in FIG. 1 an integrator 18 of conventional type such as that described in U.S. Pat. No. 3,002,-713 issued to P. A. Noxon on Oct. 3, 1961 and assigned to The Bendix Corporation, assignee of the present invention. Integrator 18 comprises generally a rate generator 20 connected to a primary winding 29 of a phase reversing transformer 30, and which transformer 30 has a pair of isolated secondary windings 31 and 33 inductively connected to the primary winding 29. A servomotor 22 is coupled by a shaft 24 to the rate generator 20 and a synchro 25 is coupled through a gear train 28 to servomotor 22. Servomotor 22 is connected to a servo amplifier 38, and which servo amplifier 38 is connected to secondary winding 33 of transformer 30. Amplifier 14 is connected to secondary winding 31 of transformer 30.

As shown by the configuration of FIG. 1 and as explained in the aforenoted U.S. Pat. No. 3,002,713, in response to signals $E_b$ and $E_d$ and which signals are proportional as heretofore noted, a signal $E_n$ is provided across synchro output conductors 30 and 32 as the integral of displacement signal $E_d$. Signal $E_n$ and signal $E_d$ are summed at summation point 34 for providing a summation signal $E_s$ which is applied to the control signal chain for controlling the aircraft.

Integrator 18 provides across secondary winding 33 of transformer 30 a velocity damping voltage $E_t$ and provides across secondary winding 31 a voltage $E_r$ which is a function of integrator 18. Thus, voltage $E_r$ is the derivative of rotation $\theta$ of shaft 24, and which shaft rotation $\theta$ is the integral of signal $E_b$, the driving voltage for integrator 18. It is to be noted that transformer 30 is provided to permit independent phasing of voltage $E_r$. In the configuration shown in FIG. 1, the phase of voltage $E_t$ is always negative with respect to voltage $E_a'$. However, the phase of voltage $E_r$ can be either positive or negative dependent upon the alarm sensing levels required.

Voltage $E_r$ and voltage $E_a'$ are combined at a summation point 40 to provide across a conductor 42 and ground a summation voltage $E_f$ and voltage $E_a$ provided across conductor 10 and ground are applied to a comparator 44 which provides a voltage $E_x$ for operating an alarm circuit when the difference between the applied voltage exceeds a predetermined threshold level.

The independent alarm sensing capability of the configuration shown in FIG. 1 is best explained with reference to the representative block diagram of FIG. 2. Thus, signal $E_1$ from radio receiver 2 is applied to means 50 which is shown for purposes of example as an amplifier having a gain factor $K_b$ and which amplifier 50 provides the signal $E_b = E_1 K_b$. Signal $E_b$ is applied through servo amplifier 28 to servomotor 22 of integrator 18 for integrating signal $E_b$, and wherein the integrated signal $E_n = E_b t = E_1 K_b t = E_1 K_b (1/S)$ (in La Place form) is provided by synchro 25 of integrator 18 as shown in FIG. 1. Rate generator 20 of integrator 18 is connected to servomotor 22 through shaft 24 and differentiates the integrated signal $E_n = E_1 K_b (1/S)$ to provide the signal $E_r = E_1 K_b (1/S) S = E_1 K_3$ where $K_3$ is a combined gain factor.

Signal $E_1$ from radio receiver 2 is applied to means 52 which is shown for purposes of example as an amplifier having a gain factor $K_d$, and which amplifier 52 provides the displacement signal $E_d$. Displacement signal $E_d$ is applied to summation means 34 and summed thereat with signal $E_n$ to provide signal $E_s$ which in turn is applied to the control signal chain as heretofore noted with reference to FIG. 1. Signal $E_d$ is applied to means 54 shown for purposes of example as an amplifier having a gain factor $K_a$, and which amplifier 54 provides the signal $E_a$.

Redundant signal $E_2$ provided by radio receiver 4 is applied to means 56 shown for purposes of example as an amplifier having a gain factor $K_a'$, and which amplifier 56 provides the signal $E_a'$. Signal $E_a'$ is applied to summation means 40 and summed thereat with signal $E_r$ from integrator 18 to provide the combined signal $E_f$. Signal $E_f$ and signal $E_a$ are applied to comparator 44 which inverts signal $E_f$ and provides the signal $E_x$ when the difference between the noninverted signal ($+E_a$) and the inverted signal ($-E_f$) exceeds the predetermined threshold.

It is to be noted that the polarity assignment of signal $E_a$ and of gain $K_d$ is arbitary. Moreover, since again $K_d$ is positive, again $K_b$ is positive, gain $K_b$ must alseo be positive in order that the system operate properly. With the aforementioned in mind, the general equation for the output voltage $E_x$ from comparator 44 is as follows:

$$E_x = E_1 K_1 - E_1 K_3 - E_2 K_a' \text{ where } K_1 = K_d + K_a \quad (1)$$

In the event of a system failure, i.e., if the signals from one of the radio receivers 2 or 4 is zero, $E_x$ will reach an alarm level $E_D$, when the functioning radio receiver 2 or 4 provides an output voltage $E_T$ at the threshold level of the comparator. Subject to these conditions, when, for example, radio receiver 4 malfunctions, Equation 1 becomes:

$$|E_D| = E_T K_1 - E_T K_3 - 0 \quad (2a)$$
$$|E_D| = -K_T K_a' \quad (2b)$$

Figure 2:
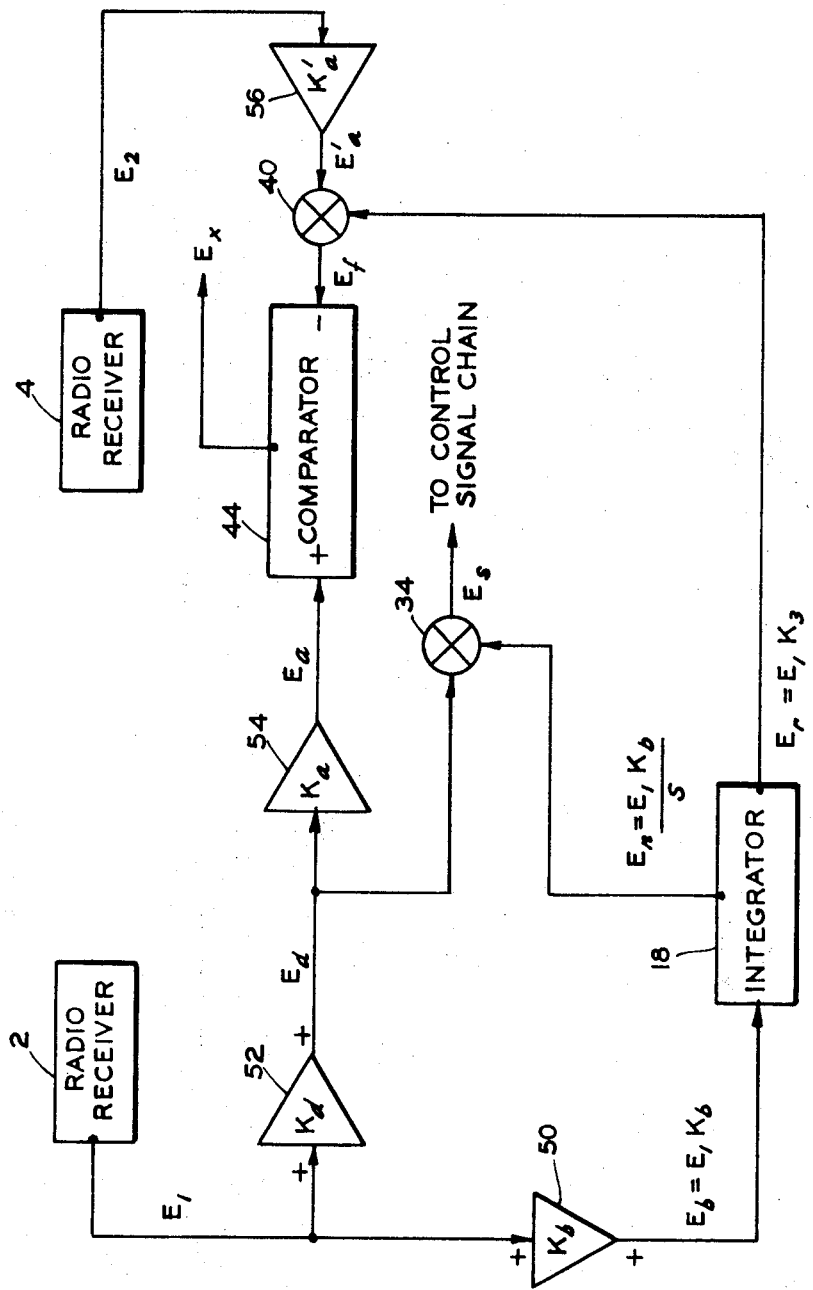
FIG. 2 is a block diagram showing the independent alarm sensing capability of the configuration shown in FIG. 1.

From analysis of FIG. 2, $$E_n/t = E_1 K_b \quad (3)$$

and $$E_r = E_1 K_3 \quad (4)$$

Dividing Equation 3 by Equation 4 provides a gain ratio as follows:

$$\frac{E_n}{E_r t} = \frac{K_b}{K_3} \quad (5)$$

If an alarm condition must exist when, independent of signal $E_1$ from radio receiver 2, signal $E_N/t$ reaches a predetermined value $E_B/t$, then signal $E_r$ must attain the value $E_D$. These values are substituted in Equation 5, and Equation 5 is solved for $E_D$ as follows:

$$|E_D| = \frac{E_b K_3}{K_b t} \quad (6)$$

Dividing Equation 6 by Equation 2a provides an expression for $$\frac{E_B}{E_T K_b t}$$

as follows:

$$\frac{E_B}{E_T K_b t} = \frac{K_1 - E_3}{K_3} \quad (7)$$

In Equation 1, if the system is operating normally, signal $E_x = 0$. Since signals $E_1$ and $E_2$ are provided by redundant sources (radio receivers 2 and 4) signal $E_2 = E_1$. Substituting the aforementioned conditions in Equation 1 yields:

$$0 = E_1 K_1 - E_1 K_3 - E_1 K_a' \quad (8)$$

then solving for $K_3$:

$$K_3 = K_1 - K_a' \quad (9)$$

Substituting for $K_3$ in Equation 7 provides:

$$\frac{E_B}{E_T K_b t} = \frac{K_1 - K_3}{K_1 - K_a'} \quad (10)$$

Since $K_a$ and $K_b$ are system gains which have been predetermined, the values and polarities of gains $K_a'$ and $K_3$ can be determined once the alarm conditions for $E_B/t$ and $E_T$ are specified. By examination of Equations 9 and 10 the following can be logically deduced:

(1) For $$\frac{E_B}{E_T K_b t} > 1$$

$K_a'$ cannot be positive.
 (a) If $K_3$ is positive $K_a' > K_3$
 (b) $K_3$ can have any negative value (2) For $$\frac{E_B}{E_T K_b t} < 1$$

(a) If $K_a'$ is negative, $K_3$ is positive and $K_3 > K_1$.
 (b) If $K_a'$ is positive, $K_1 \geq 2K_a'$, $K_3$ is positive and $K_1 > K_3$.

(3) If $$\frac{E_B}{E_T K_b t} = 1$$

$K_a' = K_3 = .5 K_1$ and both $K_a'$ and $K_3$ must be positive.

The preceding mathematical analysis shows that independent alarm sensing for the integrating and displacement functions of the configuration of FIG. 1 can be obtained by means of a single comparator. The configuration shown in FIG. 1 can be rearranged in a number of different ways and still function in the manner described. For example, the integrator can be driven by radio receiver 4 instead of by radio receiver 2. Signal $E_r$ can be summed with signal $E_a'$ rather than with signal $E_a$. Thus, for control systems generating a desired control function and also generating an additional function which is directly proportional to the control function, system monitoring is accomplished by means of a single comparator and without duplicating the control system.

Although only one embodiment of the invention has been illustrated and described, various changes in the form and relative arrangements of parts, which will now appear to those skilled in the art may be made without departing from the scope of the invention. Reference is, therefore, to be had to the appended claims for a definition of the limits of the invention.

What is claimed is:

1. A monitor for a system providing a control signal, comprising:

means for providing a signal corresponding to a control function;

means connected to the control function signal means and responsive to the signal therefrom for providing a signal corresponding to a condition associated with the control function;

means connected to the control function signal means and responsive to the signal therefrom for providing a first signal proportional to the condition signal;

means connected to the control function signal means and responsive to the signal therefrom for providing a second signal proportional to the condition signal;

means for providing a redundant signal corresponding to the control function;

means connected to the redundant control function signal means and responsive to the signal therefrom for providing a third signal proportional to the first signal;

means connected to the control function signal means and to the second signal means and responsive to the signals therefrom for providing a fourth signal as a function of the control function signal;

first combining means connected to the condition signal means and to the fourth signal means for combining the signals therefrom to provide the control signal;

means connected to the fourth signal means for providing a signal as a function of said means;

second combining means connected to the last mentioned means and to the third signal means for combining the signals therefrom; and a comparator connected to the first signal means and to the second combining means for comparing the the signals therefrom and for providing a signal for actuating an alarm when the difference between the compared signals exceeds a predetermined level.

2. A monitor as described by claim 1, including:

an amplifier having a pair of input terminals connected to the control function signal means, a first output terminal and a grounded second output terminal;

a first resistor connected to the first output terminal;

a second resistor connected to the first resistor; and a third resistor connected to the second resistor and connected to the grounded second output terminal.

3. A monitor as described by claim 2 including:

a terminal connected intermediate the second and third resistors; and the first signal being provided across the grounded second output terminal and the last mentioned terminal.

4. A monitor as described by claim 2, wherein:

the second signal is provided across the first output terminal and the grounded second output terminal.

5. A monitor as described by claim 2, including:

a terminal connected intermediate the first and second resistors; and the signal corresponding to a condition associated with the control function being provided across the grounded second output terminal and the last mentioned terminal.

6. A monitor as described by claim 3 including:

another amplifier having a pair of input terminals connected to the redundant control function signal means and third and fourth output terminals;

a first resistor connected to one of the third and fourth output terminals; and a fourth resistor connected to the third resistor and connected to the other of the third and fourth output terminals.

7. A monitor as described by claim 6, wherein:

the third signal is provided across the third and fourth output terminals.

8. A monitor as described by claim 6, including:

a rate generator;

a transformer having a primary winding connected to the rate generator and a pair of isolated secondary windings inductively coupled to the primary winding, with one of said secondary windings connected to the fourth resistor and the other secondary winding connected to the first about terminal of the first mentioned amplifier;

a servo motor;

means for coupling the servo motor to the rate generator;

a servo amplifier connected to the servo motor and connected to the other secondary winding;

a synchro having one output terminal connected to the terminal intermediate the first and second resistors and another output terminal;

means for coupling the synchro to the servo motor; and the control signal being provided across said other output terminal and ground.

9. A monitor as described by claim 6, including:

summing means connected intermediate the third and fourth resistors; and the comparator being connected to the summing means and to the terminal intermediate the second and third resistors for comparing the signals therefrom and for providing the alarm signal when the difference between the compared signals exceeds the predetermined level.

References Cited

UNITED STATES PATENTS

| | | |
|---|---|---|
| 2,487,793 | 11/1949 | Esval et al. |
| 2,823,877 | 2/1958 | Hess. |
| 2,869,063 | 1/1959 | Hess. |
| 2,973,927 | 3/1961 | Miller et al. |
| 3,135,485 | 6/1964 | Miller. |
| 3,252,675 | 5/1966 | Close et al. |

THOMAS E. LYNCH, Primary Examiner

U.S. Cl. X.R.

318—30, 448